United States Patent
Pan et al.

(10) Patent No.: US 7,023,780 B2
(45) Date of Patent: Apr. 4, 2006

(54) LINK WRITING METHOD FOR A RECORDABLE OR REWRITABLE COMPACT DISK AND DRIVE FOR USING THE METHOD

(75) Inventors: Jyh-Shin Pan, Hsin Chu (TW); Chao-Long Tsai, Hsin Chu (TW)

(73) Assignee: MediaTek, Inc., Hsin-Chu (TW)

( * ) Notice: Subject to any disclaimer, the term of this patent is extended or adjusted under 35 U.S.C. 154(b) by 489 days.

(21) Appl. No.: 09/800,896

(22) Filed: Mar. 8, 2001

(65) Prior Publication Data

US 2002/0048240 A1 Apr. 25, 2002

(30) Foreign Application Priority Data

Oct. 25, 2000 (TW) ........................... 89122511 A

(51) Int. Cl.
*G11B 7/0045* (2006.01)

(52) U.S. Cl. .................... 369/53.24; 369/47.31
(58) Field of Classification Search ............. 369/47.31, 369/53.24, 47.33
See application file for complete search history.

(56) References Cited

U.S. PATENT DOCUMENTS

| 5,144,610 | A | * | 9/1992 | Horiguchi | 369/53.24 |
| 5,784,355 | A | * | 7/1998 | Abe | 369/59.12 |
| 5,815,472 | A | * | 9/1998 | Kuroda et al. | 369/47.33 |
| 6,119,210 | A |  | 9/2000 | Leon et al. | |
| 6,128,261 | A |  | 10/2000 | Suzuki | |
| 6,198,707 | B1 |  | 3/2001 | Yamamoto | |
| 6,266,308 | B1 |  | 7/2001 | Andoh | |
| 6,266,318 | B1 |  | 7/2001 | Honda et al. | |
| 6,356,520 | B1 |  | 3/2002 | Hanamoto et al. | |
| 6,414,925 | B1 |  | 7/2002 | Andoh | |
| 6,418,099 | B1 |  | 7/2002 | Yamamoto | |
| 6,487,616 | B1 |  | 11/2002 | Hayashi | |
| 6,538,962 | B1 | * | 3/2003 | Hyun | 369/30.23 |
| 6,587,416 | B1 | * | 7/2003 | Tsukihashi | 369/59.14 |
| 6,728,180 | B1 | * | 4/2004 | Park | 369/53.11 |
| 2001/0006495 | A1 |  | 7/2001 | Hayashi et al. | |
| 2001/0006496 | A1 |  | 7/2001 | Hayashi et al. | |
| 2001/0006498 | A1 |  | 7/2001 | Hayashi et al. | |

FOREIGN PATENT DOCUMENTS

| EP | 0 974 966 A1 | 1/2000 |
| JP | 10-049990 | 2/1998 |
| JP | 2000-040302 | 2/2000 |
| JP | 2000-149263 | 5/2000 |
| JP | 2001-216733 | 8/2001 |
| JP | 2002-093036 | 3/2002 |

* cited by examiner

*Primary Examiner*—Brian E. Miller
*Assistant Examiner*—Michael V. Battaglia
(74) *Attorney, Agent, or Firm*—Hogan & Hartson L.L.P.

(57) ABSTRACT

A link writing method for a recordable or rewritable compact disk includes recording a writing interruption address and enabling a succeeding writing process after the writing interruption. Enabling a succeeding writing process includes searching the linking area and enabling a start writing signal and activating a laser power. The method can link a succeeding writing area with a previously written interrupted area with sufficient accuracy to allow the data frame to be successfully processed by error correction within the host drive. The linking area may be positioned by counting the values of the interrupted block, the interrupted data frame, and the interrupted bit count or by detecting a blank area. Other techniques for positioning the linking area include detecting an unwritten area having a length greater than a maximum or writing a characteristic pattern after an interruption.

21 Claims, 9 Drawing Sheets

LINK WRITING METHOD FOR A RECORDABLE OR REWRITABLE COMPACT DISK AND DRIVE FOR USING THE METHOD

BACKGROUND OF THE INVENTION

1. Field of the Invention

This invention relates to a writing method and device for a recordable or rewritable compact disk, and more particularly, to a link writing method and device that restarts writing after writing has been interrupted.

2. Discussion of the Related Art

Recordable or rewritable optical disk media typically include a continuous spiral groove which extends for the entire data storage capacity of the disk. CD-based optical disk media architectures utilize a continuous spiral groove with sectors (also called "blocks") of equal length, which are accessed at a constant linear velocity (CLV).

A recordable compact disk (CD-Recordable or CD-R) or a rewritable compact disk (CD-Rewritable or CD-RW) is a CD-based optical disk medium, and includes a continuous spiral CLV groove. Input data are modulated and written into the continuous spiral CLV groove. In general, the coding modulation of stored CD-R data is an eight-to-fourteen modulation (EFM). The eight-to-fourteen modulation turns the input data signal, along with error correction data, address information, sync pattern (synchronization pattern) and other miscellaneous content into an encoded binary stream of bits, expanding every eight bits of data into fourteen bit words, with an additional three bits inserted into the bit stream to separate words.

FIG. 1 shows the data specification for each recording sector in a CD-based optical disk medium. As shown in FIG. 1, each recording second includes 75 recording blocks and each recording block includes 98 data frames. Moreover, each of the data frames consists of 588 channel bits including a sync pattern containing 24 channel bits, control and display data containing 14 channel bits, information data, correction parity data and other information. Since the CD-R data storage scheme does not provide identification marks along the groove to identify data recording positions precisely, each recording sector is formatted with a header having a great deal of information to aid in synchronizing the rotation of the disk and obtaining data framing. The sector header adds a great deal of overhead to the sector. Moreover, a limited number of entries may be placed in the table of contents (TOC) on the CD-R disk for locating the beginning of the recorded areas. Therefore, it is very important for a CD-R storage device not to interrupt the data writing process because of the overhead penalty.

Current CD-R storage devices use a buffer that accumulates the input data and organizes the data into sectors for writing on the disk in a continuous sequence of sectors. When the buffer of a current CD-R storage device does not receive input data from the host on a timely basis (due to higher priority tasks or interrupts using host resources), the buffer may under-run and may become empty, causing the writing process to be halted. This results in a data file being partially written. One proposed solution, which is undesirable, is to stop writing sectors upon the occurrence of the under-run. It is not possible to restart the writing process after stopping because the succeeding recording position cannot be located precisely. Most often, the user application cannot deal with the problem of linking between a prior recording process and a succeeding recording process, so the disk is considered ruined and is discarded.

In light of this problem, U.S. Pat. No. 6,119,201 discloses a method employing a formatted padding sector to resolve the under-run problem. The method disclosed by the patent writes one or several formatted padding sectors when a buffer encounters an under-run condition. While the method can resolve the under-run problem without stopping writing, it wastes disk space as it requires writing one or several complete formatted padding sectors. Moreover, the method wastes time in reading since it needs to judge if the read data are padding sectors or not. What is more, the method cannot overcome the problem of writing interruption caused by a servo problem.

Therefore, it is necessary to have a link writing method and device for a recordable compact disk to restart the writing process at the location where it is interrupted. This would effectively resolve the problems of writing interruption caused by buffer under-run or other problems.

FIG. 2 illustrates the situation in which the data frame of the succeeding (restarted) writing process overlaps the previous data frame according to a prior strategy. As the demand on the length of the data frame stored on the CD-based medium is rigorous, the length of the data frame is set to 588T (bits) in order to correctly read the data written. But as shown in FIG. 2, if the $(n+1)^{th}$ data frame is written before the interruption and the $(n+2)^{th}$ data frame is written imprecisely after the interruption, the later written frame may overlap the previously written frame. The resulting overlap may cause a reading drive to be unable to differentiate between the two written data frames, and a data reading error occurs. As shown in FIG. 2, either range (A) is treated as two frames or range (B) is treated as one frame and either will cause a data reading error.

Moreover, FIG. 3 illustrates the situation that the data frame of the succeeding writing forms a gap with the previous data frame according to a prior strategy. As shown in FIG. 3, a linking gap may appear between a written $n^{th}$ frame and a succeeding written $(n+1)^{th}$ frame when the writing is interrupted between the $n^{th}$ and $(n+1)^{th}$ frames. In this situation a reading error also occurs. This is because the linking gap has redundant channel bits, which cause the reading drive to be unable to differentiate between the data frames when it is reading. For instance, as shown in FIG. 3, either range (A) is treated as two frames or range (B) is treated as one frame and either will cause a data acquisition error. Therefore, it is very important to position the writing interruption address accurately and to begin successive writing accurately.

SUMMARY OF THE PREFERRED EMBODIMENTS

It is therefore an object of the invention to provide a link writing method for a recordable or rewritable optical disk and a drive for using the method for resolving the problem of writing interruption resulting from a data under-run or other cause during the writing process of the optical disk.

An aspect of the invention provides a link writing method for a recordable or rewritable optical disk comprising recording an interrupted position by storing values of an interrupted sector, an interrupted data frame, and an interrupted bit count when data under-run or other causes occur. The method enables a succeeding writing process when the cause for the writing interruption is eliminated. The succeeding writing process comprises positioning a linking area in accordance with the values of the interrupted sector, the interrupted data frame, and the interrupted bit count. The method includes enabling the start writing signal and settling the laser power. The linking process includes:

(1) reading the values of the interrupted sector, the interrupted data frame, and the interrupted bit count of the interrupted position;

(2) setting the linking position, including starting sector, starting frame and starting bit count;

(3) searching the interrupted sector area by counting the sector's SYNC signal to the starting sector;

(4) searching the interrupted data frame area by counting the EFM SYNC signal to the starting frame; and (5) searching the interrupted bit area by counting the EFMCLK pulse signal to the starting bit count.

Therefore, the linking area is linked to the interrupted position and the data frame is written without causing uncorrectable errors during data reading.

Another aspect of the invention provides a link writing method for a recordable or rewritable optical disk including recording an interrupted position by storing values of an interrupted sector, an interrupted data frame, and an interrupted bit count when data under-run or other interruption occurs. The method enables a succeeding writing process after the writing interruption. The succeeding writing process comprises searching a linking area by comparing a read data length with a maximum run-length value, enabling a start writing signal, and activating a laser power, wherein the linking area is linked to the interrupted position sufficiently accurately that the interrupted data and successively written data together form interrupted and successively written data that can be successfully error-correction processed.

BRIEF DESCRIPTION OF THE DRAWINGS

The objectives, characteristics, and advantages of the present invention can be more fully understood by reading the following detailed description of the preferred embodiments, with reference made to the accompanying drawings as follows.

DETAILED DESCRIPTION OF PREFERRED EMBODIMENTS

The link writing method of a recordable or rewritable compact disk drive having a succeeding writing function employs an encoding link controller to precisely position the linking area and then enables a writing start signal in order to commence a succeeding writing process.

Figure 1:
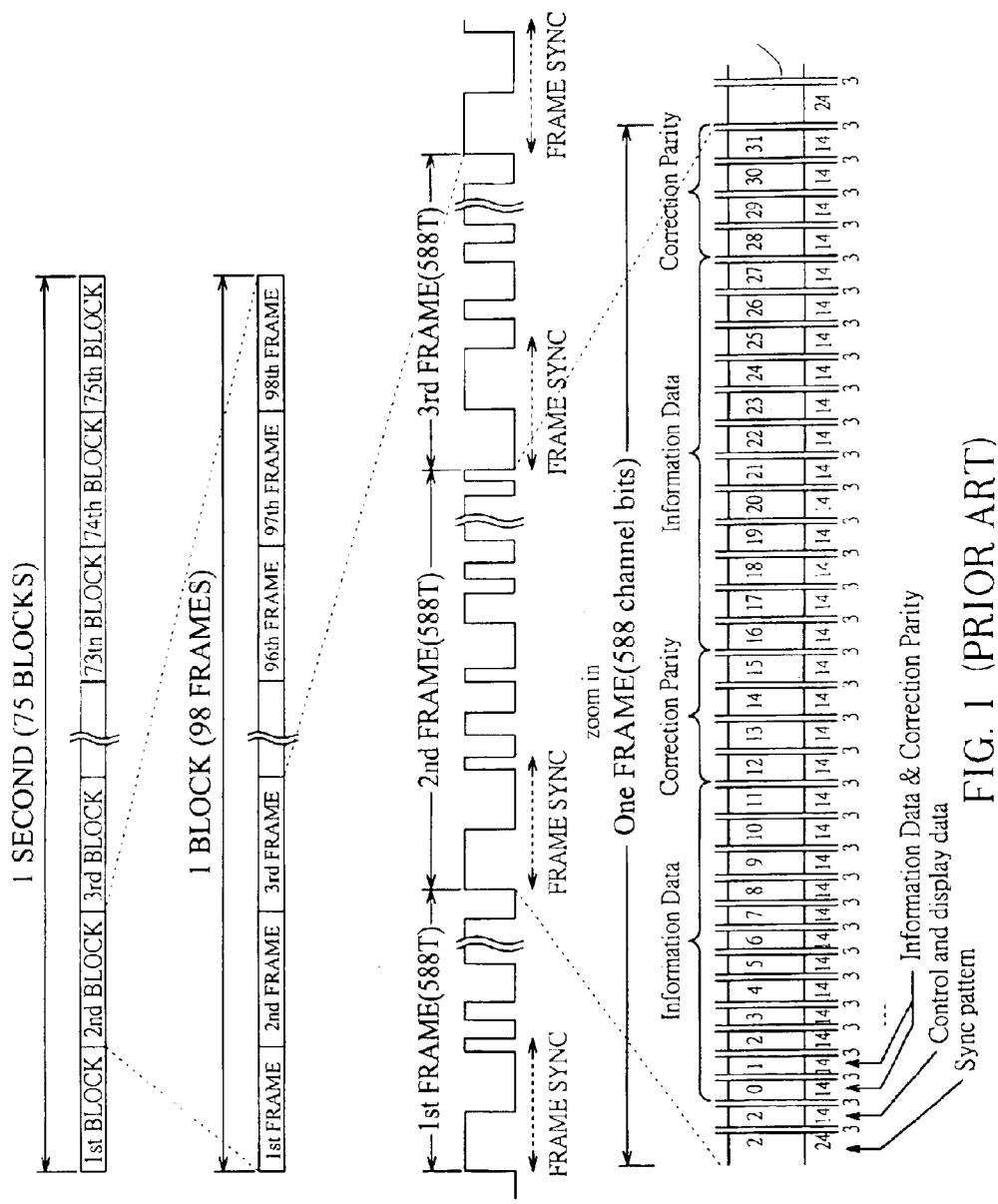
FIG. 1 shows the data specification for each recording sector according to the prior art.
Figure 2:
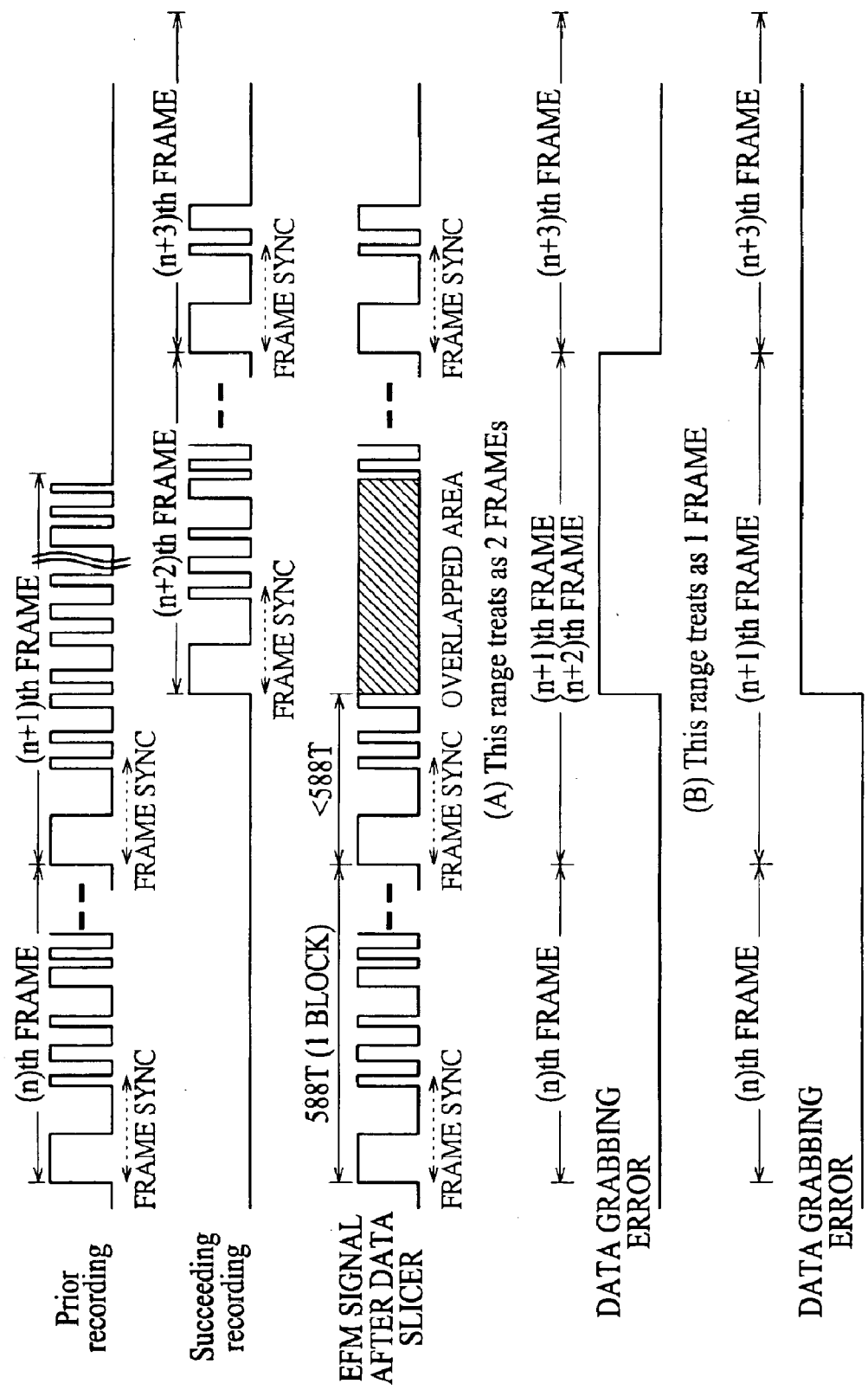
FIG. 2 illustrates the situation that a successively written data frame overlaps the previously written data frame according to a prior art strategy.
Figure 3:
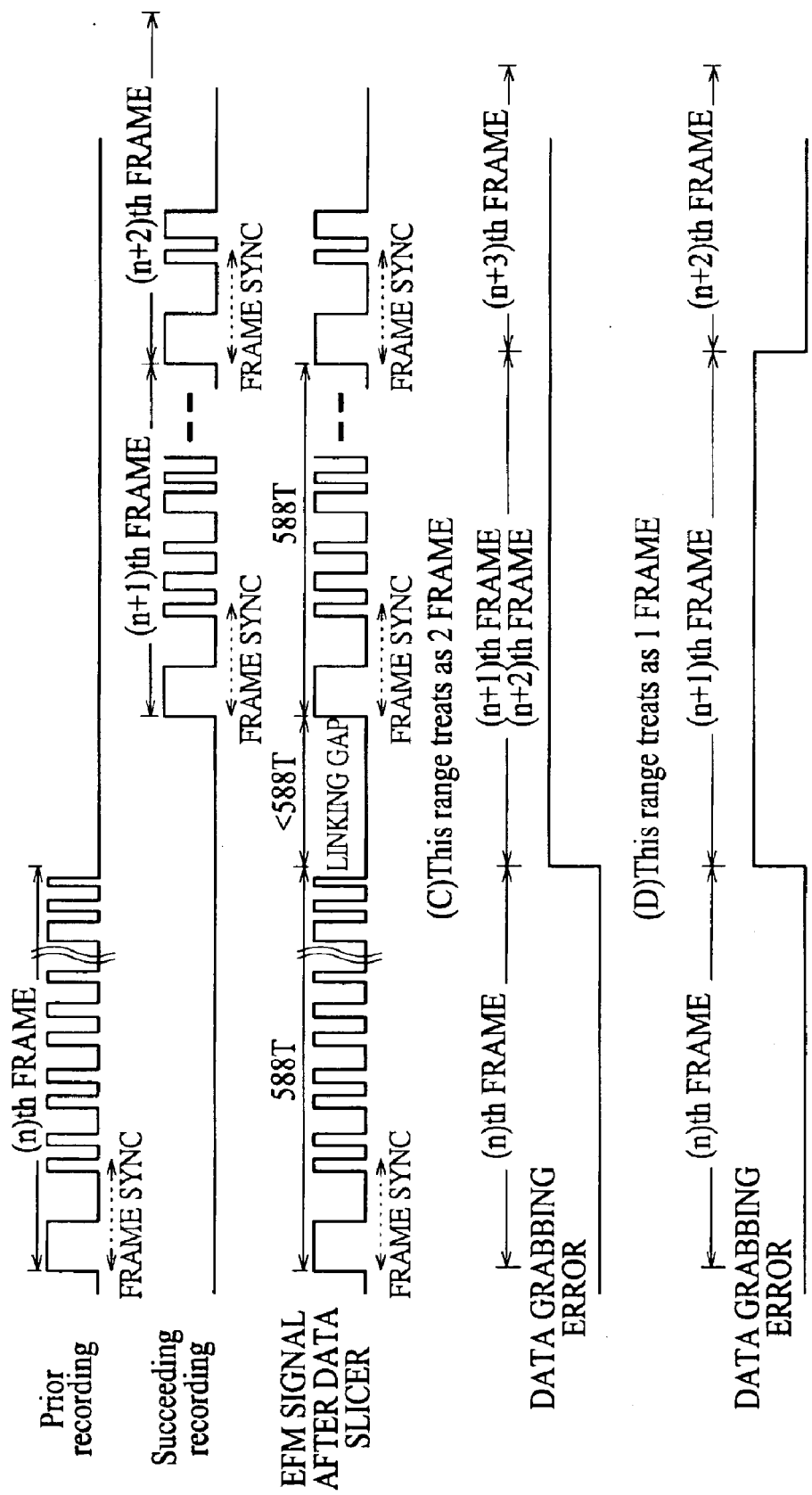
FIG. 3 illustrates the situation in which a successively written data frame forms a gap with the previous data frame according to a prior art strategy.
Figure 4:
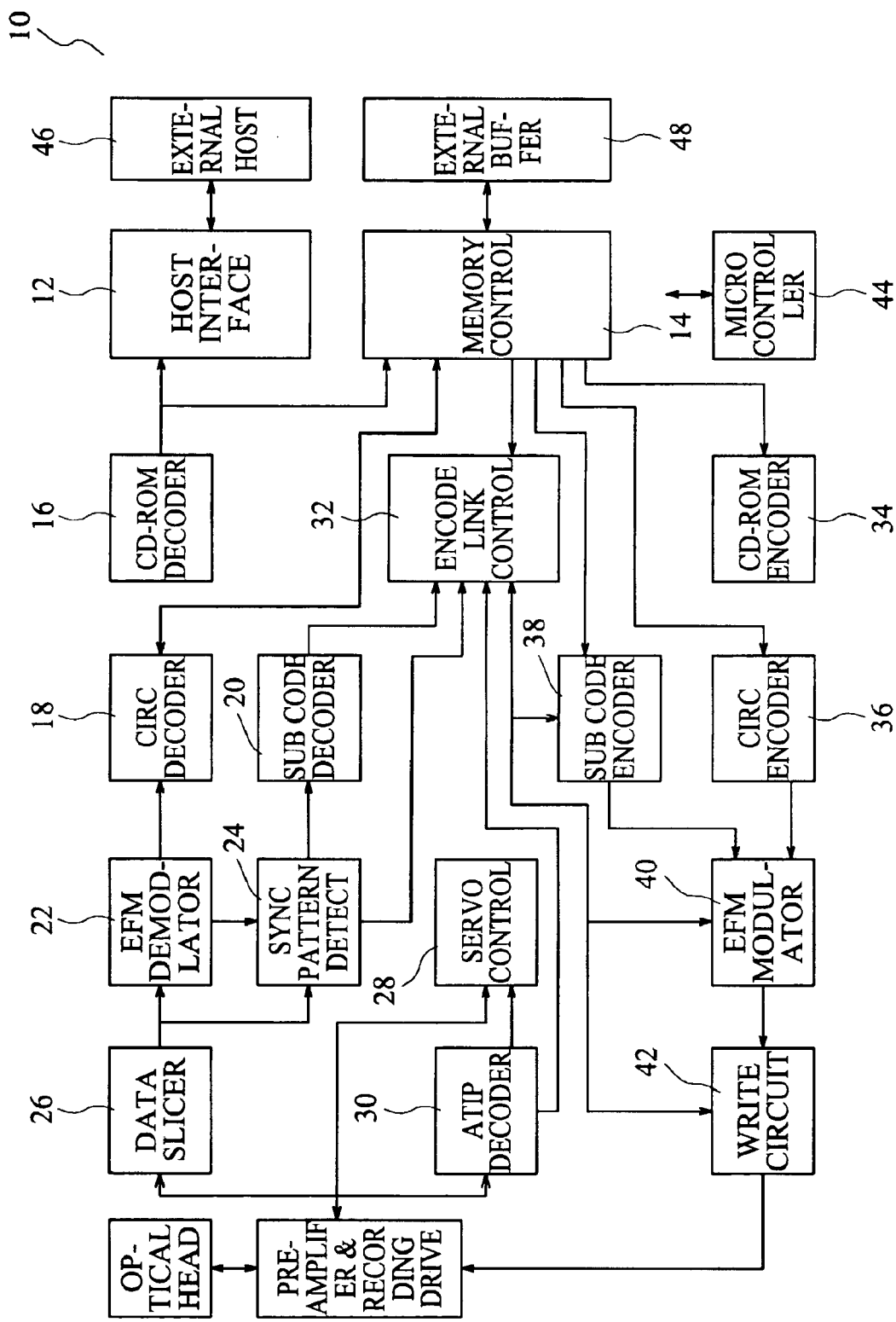
FIG. 4 is a block diagram of the recordable optical disk drive of the invention.

FIG. 4 is a block diagram of the recordable compact disk drive having a succeeding writing function according to the present invention. As shown in FIG. 4, the recordable or rewritable compact disk drive 10 includes a host interface 12, a memory controller 14, a CD-ROM decoder 16, a CIRC decoder 18, and a sub-code decoder 20. It also includes an eight-to-fourteen (EFM) demodulator 22, a SYNC pattern detector 24, a data slicer 26, a servo controller 28, an ATIP decoder 30, an encode link controller 32, a CD-ROM encoder 34, a CIRC encoder 36, a sub-code encoder 38, an EFM modulator 40, a writing circuit 42, and a microcontroller 44. The functions of most of the units shown in FIG. 4 are the same as those of the conventional recordable compact disk drive. The only difference is that the encoding link controller 32 included in the illustrated embodiment can be used to precisely position the predetermined writing address (linking area) according to the position information signals generated from the SYNC pattern detector 24, sub-code decoder 20 and ATIP decoder 30. When the encoding link controller 32 detects the linking area, it generates a "start writing signal" to the microcontroller 44 so as to perform the action of succeeding writing. The function of the sub-code decoder 20 is to detect and output the time position information of the recorded block, while the function of the ATIP decoder 30 is to detect and output the ATIP time code (MSF information, Minute, Second, Frame) beforehand recorded on blank discs.

Two detecting methods are provided to precisely detect the linking area according to the present invention. The first one is the "data decoding method" and the other one is the "pattern identifying method". The "data decoding method" makes use of a decoding circuit to count the block, the frame, and the channel bits of the previously recorded and interrupted data block ending position to precisely detect the interrupted position as the linking area. The decoding circuit first searches the ATIP identifying data (MSF information) of the linking area and then precisely detects the linking area by counting the channel bits. The "pattern identifying method" detects a characteristic pattern such as a long high-reflectivity or long low-reflectivity location as the linking area.

Generally speaking, whenever the write error of the recordable compact disk drive occurs such as an under-run or servo error, the drive will enable the write error signal and stop the write action. The drive of the invention, in the mean time, also stores the write interruption address into registers. The data of the write interruption address includes the current time code of the block (also called MSF, Minute, Second, Frame), current counted value of the EFM frame, and current counted value of EFM channel bit. These data are stored into the MSF register, the EFM─SYNC─CNT register, and the EFM─BIT─CNT register, respectively. The encoding link controller 32 can thereby use the write interruption address as the start address index when it comes to succeeding writing in order to precisely locate the linking area.

Figure 5:
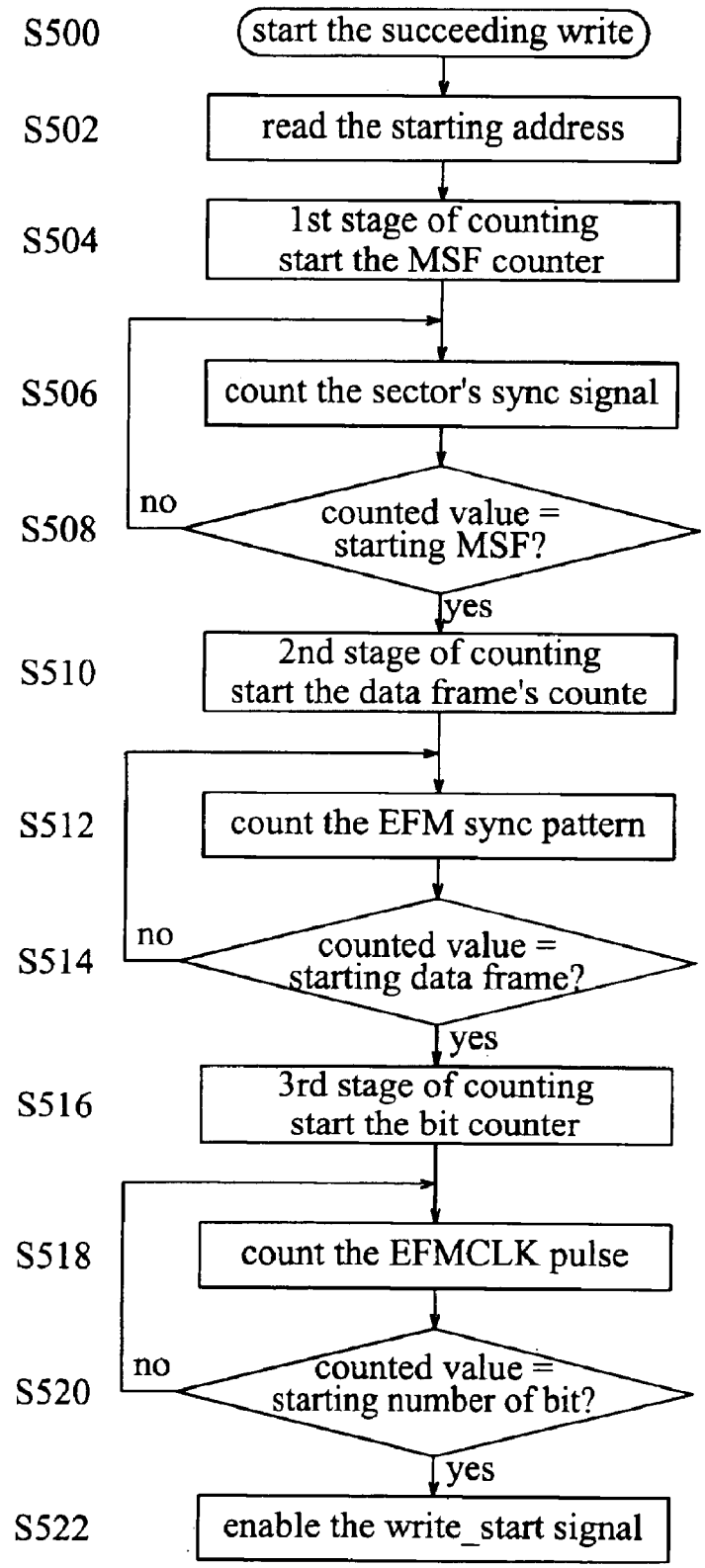
FIG. 5 is a flow chart for detecting the linking area of an embodiment of the invention.

Three stages are used to precisely detect the linking area by the encoding link controller 32. The first stage is the MSF counting, the second stage is the frame counting, and the third stage is the channel bit counting. The drive 10, after reading sufficient data or overcoming the interruption problem, will enable the succeeding writing process and start the encoding link controller 32, and in the same time, read the written area on the disk sequentially. Then, encoding link controller 32 will precisely position the linking area in accordance with the position information signals generated by the SYNC pattern detector 24 and the sub-code detector 20. Thereafter, the encoding link controller 32 sends the start writing signal to the microcontroller 44 to perform the action of succeeding writing. FIG. 5 is a flow-chart illustrating an embodiment for detecting the linking area. Referring to FIG. 5, the action of the encoding link controller 32 is illustrated as follows:

Step S500: Start the succeeding write.

Step S502: Read the data from MSF, EFM‾SYNC‾CNT, and EFM‾BIT‾CNT registers. Use the positional data as the starting address of the linking area.

Step S504: Perform the first stage counting and start the MSF counter.

Step S506: Count the output signal generated from the sub-code decoder 20 using the MSF counter.

Step S508: Compare if the counted value of the MSF counter equals the value in the MSF register. If it is equal, jump to step S510, otherwise, jump back to step S506.

Step S510: Perform the second stage counting and start the frame counter.

Step S512: Count the output signal generated from the SYNC pattern detector 24 using the frame counter.

Step S514: Compare if the counted value of the frame counter equals the value in the EFM‾SYNC‾CNT register. If it is equal, jump to step S516, otherwise, jump back to step S512.

Step S516: Perform the third stage counting and start the bit counter.

Step S518: Count the pulse signal of the EFMCLK using the bit counter.

Step S520: Compare if the counted value of the bit counter equals the value in the EFM‾BIT‾CNT register. If it is equal, jump to step S522, otherwise, jump back to step S518.

Step S522: Enable a WRITE_START signal and activate the writing laser power.

Moreover, the steps shown in FIG. 5 make use of the sub-code decoder 20 to detect the written block time code and position the linking area in relation to the interrupted writing process. Besides using this method, this discussion also presents a method making use of ATIP decoder 30 to detect the ATIP time code, which is pressed on a disk in advance, and to locate the linking area after the interrupted writing process.

By the use of this method for locating the linking area, the drive will store the address of the writing interruption area into registers. The process for storing data includes storing the counted value of the current block into the MSF register, and storing the block's written bit into the BIT‾CNT register. Afterward, the encoding link controller 32 can make use of the value of the registers as the index of a starting address to locate precisely the linking area for a succeeding writing process.

Two stages are used to precisely locate the linking area by the encoding link controller 32. The first stage is the MSF counting, and the second stage is the channel bit counting. The drive 10, after reading sufficient data or overcoming the interruption problem, will enable the succeeding writing process and start the encoding link controller 32. Then, encoding link controller 32 will precisely position the linking area in accordance with the output signals of the ATIP detector 30 and the EFMCLK pulse. Thereafter, the start writing signal is transmitted to the microcontroller 44 to perform the action of succeeding writing.

Figure 6:
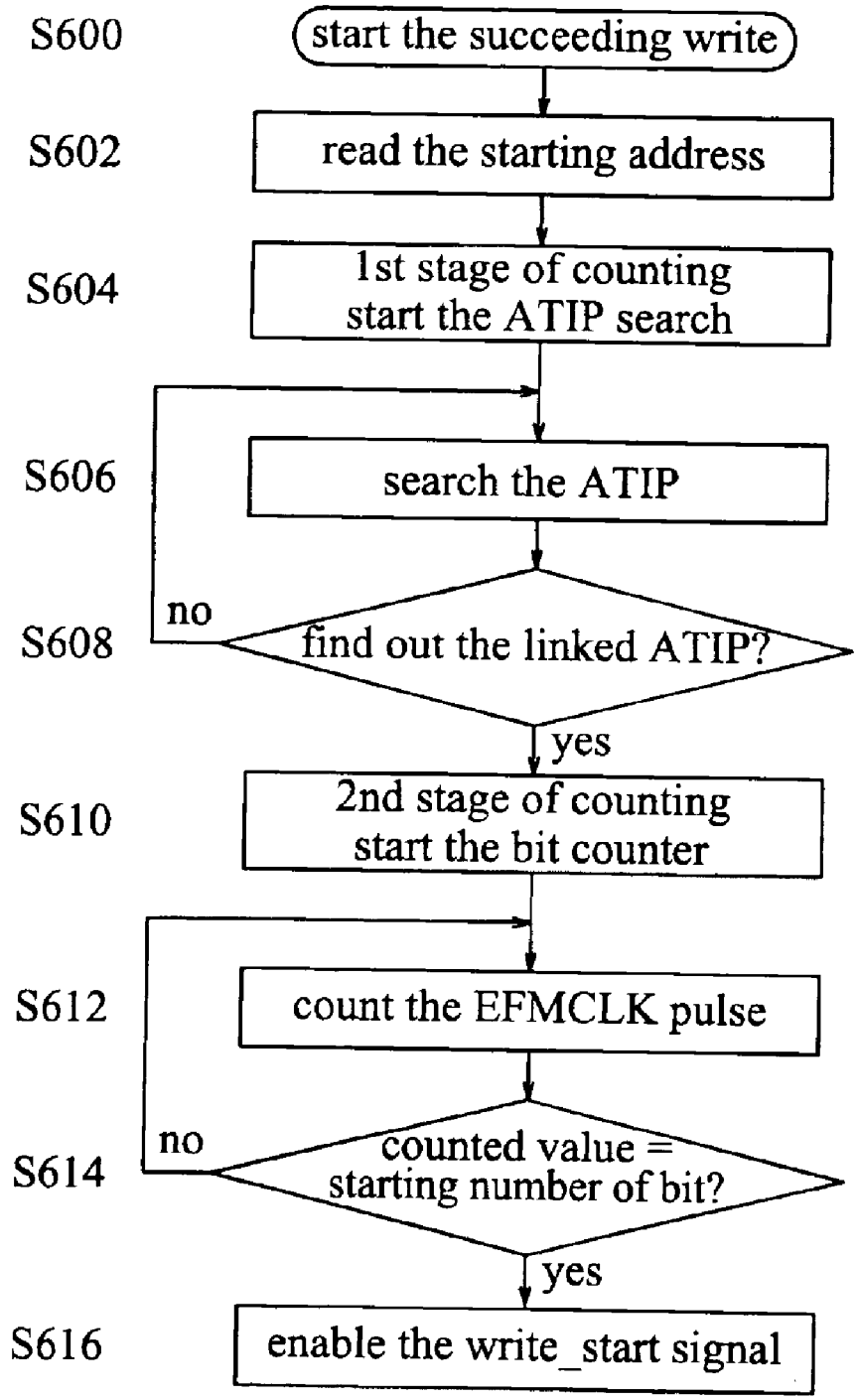
FIG. 6 is a flow chart for detecting the linking area of another embodiment of the invention.

FIG. 6 is a flow chart illustrating another embodiment for detecting the linking area of the invention. Referring to FIG. 6, the action of the encoding link controller 32 is illustrated as follows:

Step S600: Start the succeeding write.

Step S602: Read the data from MSF and BIT‾CNT registers and use the data as the positional data for detecting the linking area.

Step S604: Perform the first stage counting and start the ATIP search.

Step S606: Make use of the ATIP decoder 30 to search each of the MSF time codes of the ATIP sequentially.

Step S608: Compare if the value of the ATIP time code equals the value in the MSF register. If it is equal, jump to step S610, otherwise, jump back to step S606.

Step S610: Perform the second stage counting and start the bit counter.

Step S612: Count the EFMCLK pulse signal using the bit counter.

Step S614: Compare if the counted value of the bit counter equals the value in the BIT‾CNT register. If it is equal, jump to step S616, otherwise, jump back to step S612.

Step S616: Enable a WRITE_START signal and activate the writing laser power.

Therefore, after the linking area is located by one or another of the above-mentioned methods, the encoding link controller 32 activates the writing laser immediately and enables the WRITE_START signal. Moreover, the succeeding writing action is started as soon as the microcontroller 40 of the drive 10 receives the "WRITE_START" signal. As the encoding link controller 32 includes three stages of counting, the accuracy of the linking position can be controlled within one bit. Therefore, the starting address of the succeeding writing will not overlap with the written data preceding the interruption, nor will the succeeding writing have a gap with the written data.

Figure 7:
FIG. 7 illustrates the correct linking situation between the data frame of a succeeding writing process and a previously written data frame making use of the embodiments in FIG. 5 and FIG. 6 according to the invention.

FIG. 7 illustrates the correct writing situation between the data frame of the succeeding writing and the previously written data frame obtained by making use of the embodiments illustrated in FIG. 5 and FIG. 6. Assume that up to the $n^{th}$ data frame is written and then stopped by the drive 10 because of a buffer under-run. Afterward, when the drive 10 reads sufficient data from the host such that the writing action can be continued, the drive 10 enables the encoding link controller 32. In this way, the drive 10 can perform the writing action immediately and write the $(n+1)^{th}$ data frame and subsequent data frames when the optical head is located at the linking area. The drive 10 can finish the recording (writing) procedure as if no interruption occurred, and without any data miss between the two successive recordings. Again, as shown in FIG. 7, the succeeding writing of the $(n+1)^{th}$ data frame will not overlap with the $n^{th}$ data frame written by the previous interrupted recording. Moreover, the succeeding $(n+1)^{th}$ data frame will also not form a blank gap with the $n^{th}$ data frame. Consequently, the length of the data frame can be controlled within 588T without causing data acquisition error.

The data recorded on the disc will be incomplete during the write laser power settling stage, which will cause data reading errors. If the succeeding recording start position is the same as the stop position of a previous recording process, the extent of erroneous data is the write laser power settling time. If the write laser power settling time can be determined, the drive 10 can advance the succeeding recording start position according to the settling time. Then the previous recording data and succeeding recording data will overlap at the initial position of the succeeding writing process. Because the laser power is not enough during the settling time to write in the overlap area, the data recorded in the overlap area will not be destroyed. If the write laser power settling time can be estimated accurately, then the error data number can be reduced to "0" in the ideal case. If the write laser power settling time is estimated in error, a common drive can correct the partially erroneous bit data by using the CIRC decoding process. As a result, although a portion of the bit data in the invention is unstable before the laser light source is stabilized, this unstable bit data will not cause erroneous reading of the data since the unstable bit data can be corrected by the CIRC decoding process.

Figure 8:
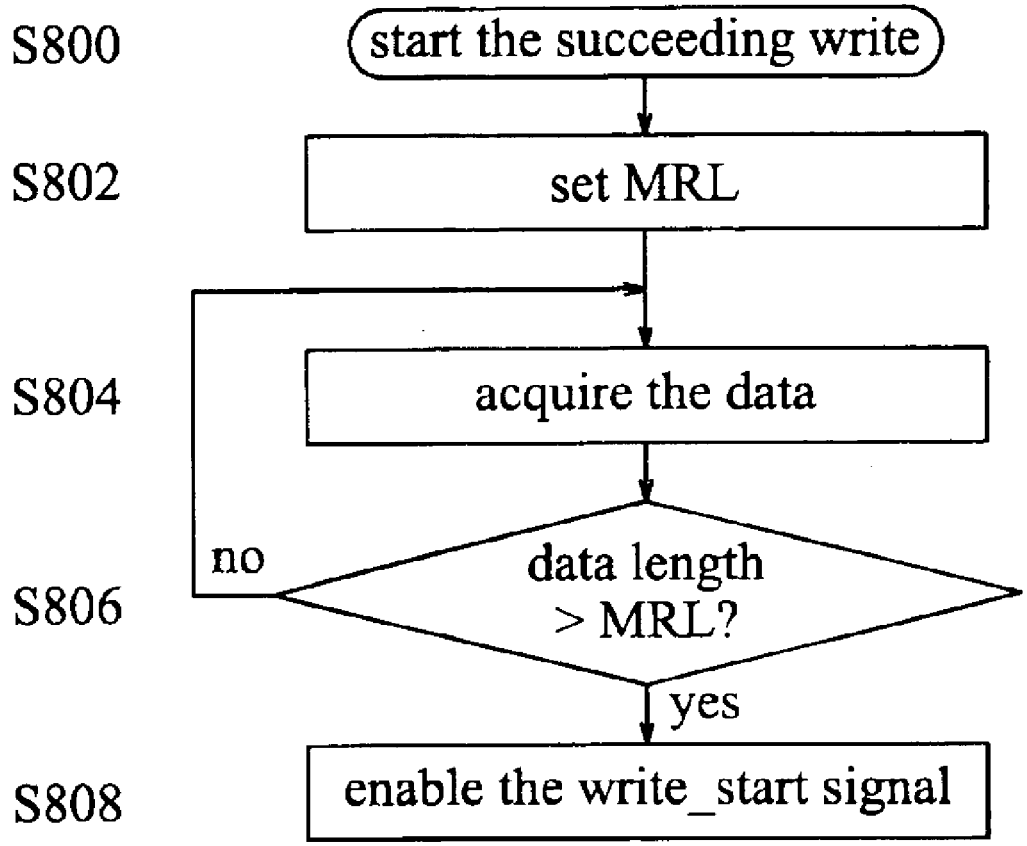
FIG. 8 is a flow chart for detecting the linking area of another embodiment of the invention.

Following is the explanation of the principle of the "pattern identifying method" of the invention. Since a common storing medium of the "write-once disk" has relatively high reflectivity, the reflected "radio frequency" (RF) signal maintains constant at a relatively high level of reflectivity for an unwritten area on the disk. And since the maximum run-length (MRL) of the EFM data is limited to a constant range, e.g. 11T for CD format, the data length following an interruption will be greater than the MRL value when the data of the blank area (unwritten area) are acquired by the drive. Therefore, the blank area can be detected by judging whether or not the data acquired is greater than the maximum run-length. The "pattern identifying method" of the invention is employed to detect, for example, the blank area that is used as the linking area of the succeeding writing. FIG. 8 is a flow chart illustrating a method for detecting the linking area of another embodiment of the invention. FIG. 8 illustrates the blank area embodiment of the "pattern identifying method" of the invention as follows:

Step S800: Start the succeeding write.

Step S802: Set MRL.

Step S804: Read the register data EFM_BIT_CNT and add the MRL to the register data to assure the correct length of the data frame.

Step S806: Judge if the data acquired is greater than the MRL. If it is greater, jump to step S808, otherwise, continue the step.

Step S808: Enable a WRITE_START signal and settle a writing laser power.

Figure 9:
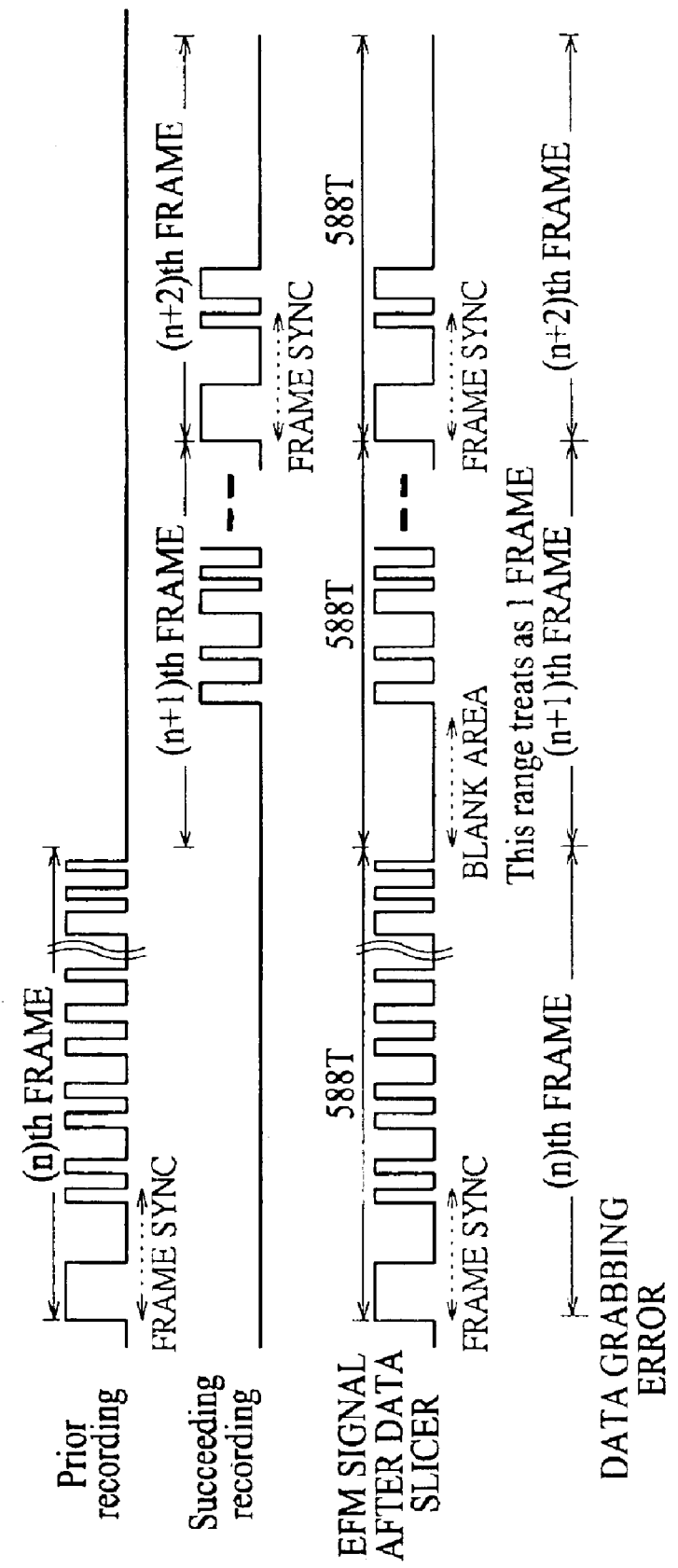
FIG. 9 illustrates the correct linking situation between the data frame of a succeeding writing process and a previously written data frame making use of the embodiment in FIG. 8 according to the invention.

While making use of the blank area embodiment of the "pattern identifying method" in detecting the blank area, the detected area will exceed the MRL's bit number value, so Step 804 is employed to add the MRL to the EFM_BIT_CNT register data as recording preset length to assure the correct length of the data frame. FIG. 9 illustrates the correct linking situation between the data frame of the succeeding writing and the previous recording data frame. As shown in FIG. 9, although the method also generates a portion of blank data (the MRL plus the laser power settling time), since the number of bits in the linking frame still corresponds to the correct length, such as 588T, the blank area can still be corrected by the CIRC decoding process.

Furthermore, as far as the write-once disc is concerned, since all the blank area belongs to an area with relatively high reflectivity, the blank area after the writing interruption can be detected accurately by employing the blank area embodiment of the "pattern identifying method". On the other hand, for the Re-Writable disk data can be over-written directly in the data area, and so the linking area after the writing interruption cannot be identified by directly employing the blank area embodiment of the "pattern identifying method". In order to be able to identify the linking area for the Re-Writable disk after writing interruption by the use of the "pattern identifying method", a section of pattern data has to be written after the writing interruption. And the section of pattern data must have the same reflectivity and have a data length greater than the MRL. In this way, the pattern data can then be employed by the "pattern identifying method" to identify the linking area after the writing interruption.

To summarize the foregoing, the link writing method for a recordable or rewritable compact disk and the drive using the method of the invention makes use of the encoding link controller to precisely detect the linking area, and starts the succeeding writing process. Therefore, it can continue to finish the writing action to assure that a readable data frame can be written when data under-run or some other servo problems occur. Because the data frame length is near nominal, including the linking area, this can be treated as a non-interrupted recording area and will not appear to be a decoding error during a subsequent reading cycle. Moreover, since the link writing method for a recordable or rewritable compact disk and the drive for using the method of the invention directly connects the data stored on the disk after being interrupted, it is treated as a normal recording procedure without any retrieval needed.

The invention has been described in terms of exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A link writing method for a recordable or rewritable optical disk comprising:

recording an interrupted position by storing values of an interrupted sector, an interrupted data frame, and an interrupted bit count when data under-run or other interruption occurs; and enabling a succeeding writing process after the writing interruption, the succeeding writing process comprising:

searching a linking area with a read data pattern having a run length greater than a maximum run-length value;

enabling a start writing signal; and activating a laser power, wherein the linking area is linked to the interrupted position so that an interrupted data frame portion and a successively written data frame portion together form an interrupted and successively written data frame that can be successfully error-correction processed.

2. The method of claim 1, wherein the searching the linking area comprises:

reading values of the interrupted sector, the interrupted data frame, and the interrupted bit count of the interrupted area;

setting values of a starting block, a starting data frame, a starting bit count of a writing starting area, and the maximum run-length value; and detecting where the read data length is greater than the maximum run-length value and setting the linking area in response thereto.

3. The method of claim 2, wherein the writing starting area is set according to the interrupted position and the maximum run-length value so as to maintain the data frame with a same length.

4. The method of claim 2, further comprising writing a section of low reflectivity pattern data following the interrupted position, wherein a length of the low reflectivity pattern data is greater than the maximum run-length value.

5. The method of claim 2, further comprising writing a section of high reflectivity pattern data following the interrupted position, wherein a length of the high reflectivity pattern data is greater than the maximum run-length value.

6. The method of claim 1, wherein the interrupted and successively written data frame is such that the data frame can be successfully CIRC processed.

7. An optical disk drive having a link writing function, comprising:
an encoding link controller for positioning a link area for a succeeding writing and generating a succeeding writing signal; and
a laser responsive to the succeeding writing signal, the laser powered in a succeeding writing process to provide laser power to an optical disk at a position spaced from an end of data written prior to a data writing interruption at least a pattern having a run length greater than a maximum run length value of the drive,
wherein a laser writing interrupted data frame portion and a successively written data frame portion together form an interrupted and successively written data frame that can be successfully error-correction processed.

8. A link writing method for a recordable or rewritable optical disk comprising:
determining an interrupted position corresponding to a writing interruption for an optical disk; and
enabling a succeeding writing process after the writing interruption, the succeeding writing process comprising:
searching a linking area with a read data pattern having a run length greater than a maximum run-length value;
enabling a start writing signal; and
activating a laser power, wherein the linking area is linked to the interrupted position so that an interrupted data frame portion and a successively written data frame portion together form an interrupted and successively written data frame that can be successfully error-correction processed.

9. The method of claim 8, wherein the searching the linking area comprises:
setting values of a starting block, a starting data frame, a starting bit count of a writing starting area according to the values of the interrupted sector, the interrupted data frame, the interrupted bit count of the interrupted area, and the maximum run-length value; and
detecting where the read data length is greater than the maximum run-length value and setting the linking area in response thereto.

10. The method of claim 9, further comprising storing values of an interrupted sector, an interrupted data frame, and an interrupted bit count when the writing interruption occurs.

11. The method of claim 10, wherein the writing starting area is set according to the interrupted position and the maximum runlength value so as to maintain the data frame with a same length.

12. The method of claim 10, further comprising writing a section of low reflectivity pattern data following the interrupted position, wherein a length of the low reflectivity pattern data is greater than the maximum run-length value.

13. The method of claim 10, further comprising writing a section of high reflectivity pattern data following the interrupted position, wherein a length of the high reflectivity pattern data is greater than the maximum run-length value.

14. The method of claim 8, wherein the interrupted and successively written data frame is such that the data frame can be successfully CIRC processed.

15. An optical disk drive device having a link writing function, comprising an encoding link controller, responsive to a data writing interruption and a successive determination that data writing can resume, the encoding link controller detecting a pattern from signals read from a disk indicative of the end of a previous interrupted data writing, the pattern having a run length greater than a maximum run length value of normally written data, the encoding link controller generating a start writing signal in response to detecting the pattern so that the device subsequently initiates a succeeding writing process in response to the start writing signal.

16. The device of claim 15, further comprising a microcontroller coupled to the encoding link controller, the microcontroller initiating the succeeding writing process in response to the start writing signal.

17. The device of claim 15, wherein the device initiates writing the pattern onto the disk after the data writing interruption.

18. The device of claim 17, wherein the pattern consists of high reflectivity pattern data having a length greater than a maximum run length value.

19. The device of claim 18, wherein the disk is rewritable.

20. The device of claim 17, wherein the pattern consists of low reflectivity pattern data having a length greater than a maximum run length value.

21. The device of claim 20, wherein the disk is rewritable.

* * * * *